UNITED STATES PATENT OFFICE.

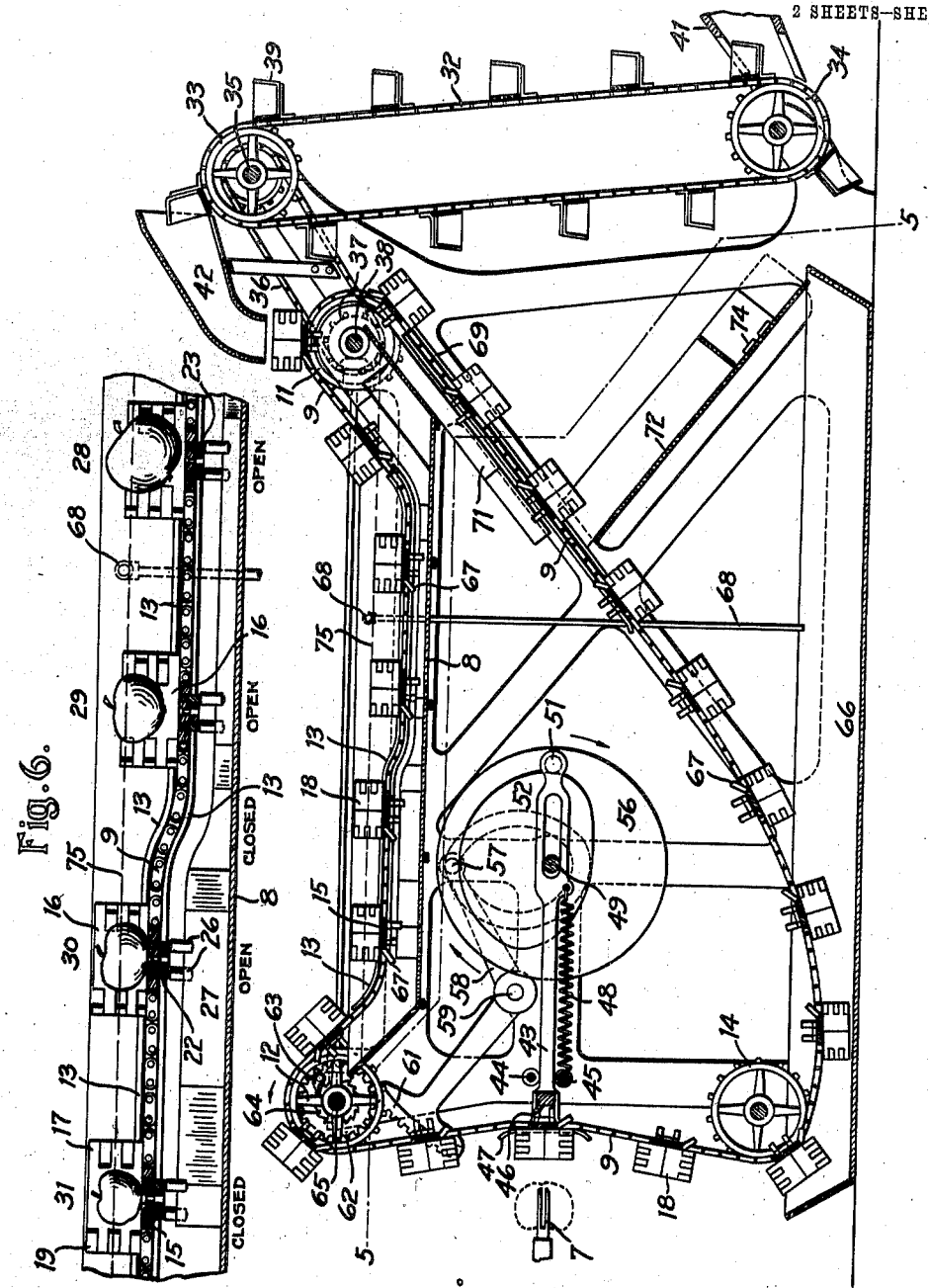

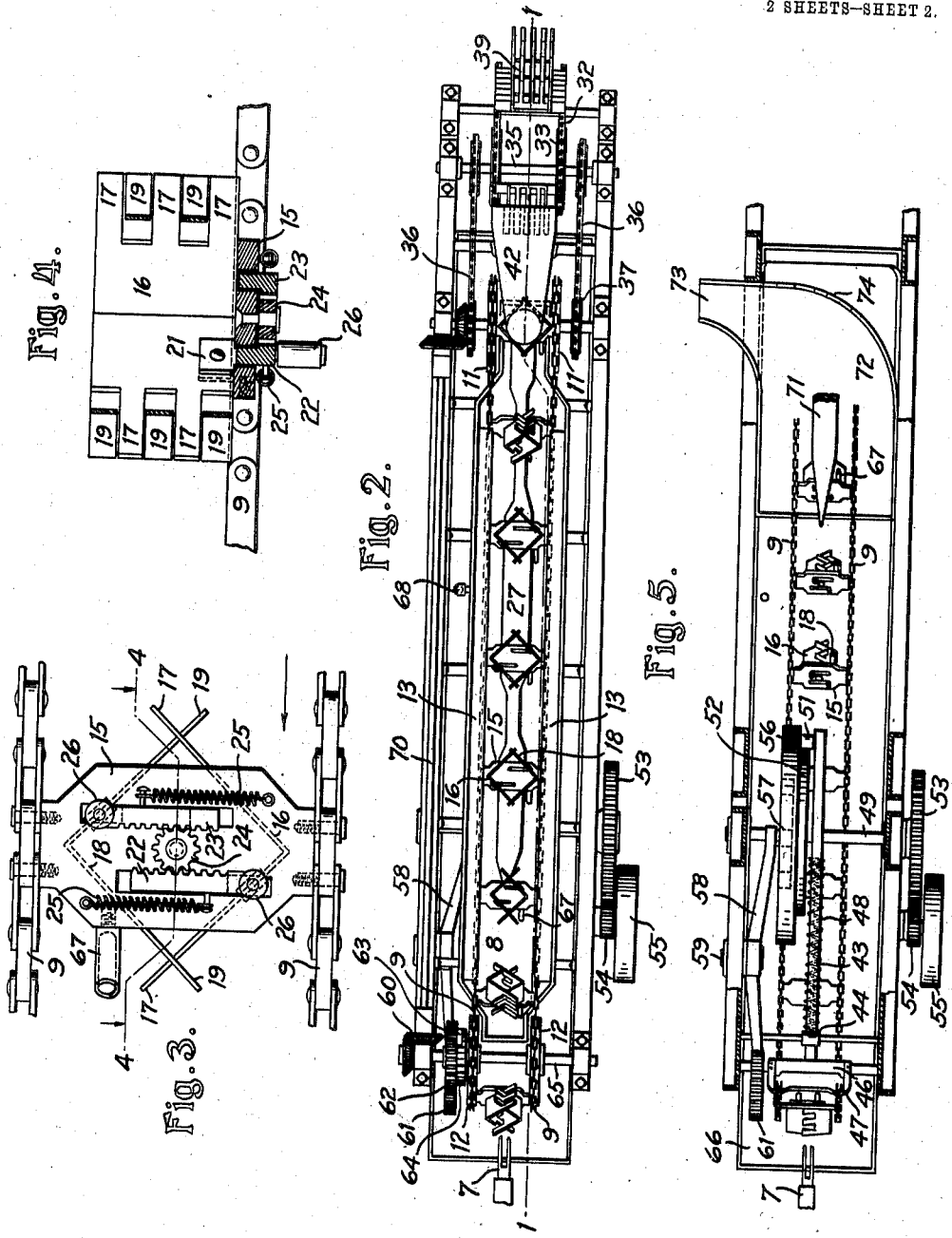

JOHN W. PEASE, OF ROCHESTER, NEW YORK.

FRUIT-HANDLING MACHINE.

1,071,333.  Specification of Letters Patent.  Patented Aug. 26, 1913.

Application filed April 5, 1911. Serial No. 619,195.

*To all whom it may concern:*

Be it known that I, JOHN W. PEASE, a citizen of the United States, and resident of Rochester, in the county of Monroe and State of New York, have invented certain new and useful Improvements in Fruit-Handling Machines, of which the following is a specification.

In paring and coring apples and similar fruit by machine it is necessary that the fruit be presented to the fork or fruit-holding device of the machine with the core-axis of the fruit in a definite position. Owing to the great variations in size and form of the fruit, this requirement has prevented the use of purely automatic devices for feeding the fruit to the operating machine, and the feeding of the fruit has always required the intervention of hand-labor. It has been discovered, however, that certain fruits, particularly the varieties of apples which are commonly used for drying purposes, are of such form that, unless very much misshapen, they will float with the core-axis in vertical position, and will assume this position if dropped at random into water or other liquid.

The present invention relates to a machine by which apples and other fruits may be rapidly and accurately fed or presented to a machine for paring or otherwise operating upon them, and particularly to a feeding-machine in which the principle of flotation just referred to may be effectively utilized in order to present the fruit automatically with its core-axis in definite position.

The object of the invention is to produce a machine which will operate rapidly and with certainty upon fruit varying in size and form, and particularly to produce a machine capable of handling apples with the requisite rapidity to supply a power-operated apple-paring and coring machine of ordinary form.

In United States Letters Patent Nos. 980,371, and 980,462, granted Jan. 3, 1911, to John A. Warner, a machine is described which operates automatically upon the flotation principle above referred to, and I do not, therefore, claim broadly, as part of the present invention, the use of this principle in an automatic machine.

The present invention resides in an arrangement by which the fruit is subjected to a combination of flotation and of mechanical action in bringing it into the required position; in the use of a series of fruit-holders moving through the liquid-receptacle, and in various other features which will be more particularly described hereinafter, by which the operation of the machine is rendered positive and rapid.

In the accompanying drawings:—Figure 1 is a longitudinal section, substantially on the line 1—1 in Fig. 2, of a machine embodying the present invention; Fig. 2 is a plan-view of the machine of Fig. 1; Fig. 3 is a bottom-view, on a larger scale, of one of the fruit-holders; Fig. 4 is a sectional side-elevation of the fruit-holder, on the line 4—4 in Fig. 3; Fig. 5 is a sectional plan-view on the line 5—5 in Fig. 1; and Fig. 6 is a sectional side-elevation of a portion of the liquid-receptacle, with the fruit-holders in various positions therein.

The illustrated embodiment of the invention is a machine particularly adapted for handling apples and for feeding them to the fork of an apple-paring and coring machine. Such a fork, designated by the reference number 7, is illustrated in Figs. 1, 2 and 5 in operative relation to the machine of the present invention, and it will be understood that this fork may be a part of a paring-and-coring-machine of any ordinary or suitable form.

The illustrated machine is designed to present apples one by one to the fork 7 and to impale them thereon, each apple being automatically brought to such a position that when so impaled its core-axis shall coincide substantially with the axis of rotation of the fork, as is necessary in connection with the ordinary paring-and-coring-machine.

To employ the principle of flotation hereinbefore referred to, the machine is provided with an elongated tank or receptacle 8 adapted to contain water. The apples are carried into and out of this tank by means of an endless conveyer comprising two chains 9. At the right-hand end of the tank these chains run over sprocket-wheels 11, and at the left-hand end over sprockets 12. Between these sprockets the chains are guided by curved, slotted guides 13 so as to cause the chains to pass downwardly into the tank at the right-hand end of the machine and upwardly out of the tank at the left-hand end, as shown in Fig. 1. From the sprockets 12 the chains pass downwardly to sprockets 14 near the bottom of the machine, and thence upwardly and rearwardly again to the sprockets 11.

The chains 9 carry a series of fruit-holders equally spaced thereon. Each fruit-holder comprises a bottom-plate 15, which is secured, at each side, to one of the chains, as shown in Fig. 3. On top of the bottom-plate are two movable fruit-clamping members 16 and 18, each of which comprises a piece of sheet-metal bent in the middle at a right-angle and terminating, at each end, in narrow fingers. The member 16 is provided with fingers 17, while the member 18 has fingers 19, which are spaced alternately with the fingers 17, so that they interlace, as shown in Figs. 3 and 4. This arrangement produces a receptacle in which the fruit is closely confined against horizontal movement, and of which the size may be varied by moving the clamping-members toward and from each other. This form of fruit-holder has the further important advantage that it so closely confines the portion of the liquid which is between the clamping-walls, that when the fruit-holder is moved horizontally from one position to another in the tank this water moves with it so that there is no substantial flow of water through the fruit-holder. Accordingly the fruit in the holder may continue, during such movement, to right itself in the relatively-quiescent liquid, and the time given to this action is accordingly lengthened without lengthening the cycle of operations of the machine.

To adjust the fruit-holders in the manner above referred to the plates 16 and 18 are fixed to blocks 21, and these blocks project downwardly through slots in the bottom-plate 15. The blocks 21 are mounted, respectively, upon two slides 22 and 23 located beneath the bottom-plate. Each slide is provided with rack-teeth meshing with a pinion 24 journaled, between the slides, on the bottom-plate. This arrangement is such that the clamping-plates are constrained to move always toward or from each other in opposite directions and through equal distances. To move the clamping-plates toward each other tension-springs 25 are connected with the slides and with the bottom-plate 15, respectively, and these springs tend constantly to draw the clamping-plates together.

At certain points in the operation of the machine the movements of the clamping-plates are controlled positively by means of cam-rollers 26 journaled on the slides 22 and 23, these rollers coöperating with suitable cams mounted upon fixed portions of the machine. One such cam 27 is fixed in the bottom of the tank 8, and, as shown in Figs. 2 and 6, this cam is provided with a plurality of portions of different width, the narrower portions permitting the cam-rollers to move freely toward each other, so that the clamping-members may close upon an apple within the fruit-holder, while other portions are wide enough to engage the cam-rollers and open the fruit-holders so as to release the apples therein.

An important feature of the operation of the present machine resides in the fact that the apples are positioned in the fruit-holders by the joint action of flotation and of mechanical pressure against the ends of the apples. To produce this result each fruit-holder is brought successively to, and stopped in, four different positions in the tank, these positions being illustrated in Fig. 6 and designated by the reference numbers 28, 29, 30 and 31. In the first position, 28, the clamping-plates are held open and the apple is free to right itself by assuming its position of equilibrium in the liquid. In the position 29 the same is true, and the time-interval employed in moving the apple from one of these positions to the other, and also in the momentary stoppage of the fruit-holder in each position, affords ample opportunity for the fruit to right itself. In moving horizontally from the position 29 to the position 30 the fruit-holder is also moved vertically to a slight extent, owing to the provision of a rise in the guides 13, as shown in Fig. 6. During this movement the clamping plates are released from the action of the cam, and they hold the apple firmly in order that it may not be deranged by the temporary assumption of an inclined position by the fruit-holder. When the fruit-holder reaches the position 30 the clamping-plates are again opened to release the fruit. In this position, however, the depth of liquid is less than in the previous positions; in fact, except in the case of the smallest apples, the depth is not sufficient to float the apple freely. Accordingly, the end of the apple bears with a certain degree of pressure against the flat bottom-plate 15, as shown in Fig. 6. As this end is usually more or less oblate, in apples of the varieties used in dry-houses, the pressure of the apple against the plate has a mechanical action tending to assist the flotation in righting the apple, that is, to bring its core-axis normal to the bottom-plate.

In moving from the position 30 to the position 31 the clamping-plates are held open through a part of the distance, to afford time for the action just described, but they are finally caused to clamp the apple, in the position 31, preparatory to the upward movement of the fruit-holder out of the tank and over the sprockets 12.

The operations just described, by which the fruit is first floated freely and then floated and clamped in a reduced depth of liquid, have two functions. In the first place, the mechanical pressure against the apple is caused to assist the flotation in righting the apple. In the second place, the apple, whatever its size, is brought close to, or into contact with, the bottom-plate, and this action is important for the reason that the bottom-plate acts as a fruit-pressing member in impaling the fruit upon the fork 7, and it is essential, for certainty of operation, that the fruit rest firmly against this plate when impaled, to guard against accidental turning of the fruit in the fruit-holder when engaged by the fork.

I have found that by employing a depth of water, at the positions 30 and 31, of about 1½ inches, the machine will act with great regularity upon apples of all of the various sizes most commonly used in dry-houses. In the case of the larger apples the mechanical action is more pronounced in the position 30, but this secures the desired result, as the larger apples are in nearly all cases symmetrical, so that even by mechanical action alone they may be brought accurately to the required position. In the case of the smaller apples, which are more likely to be deformed at the end, the influence of the liquid is more pronounced, so that such apples also are brought approximately to the required position. In the case of the very smallest apples the mechanical effect is little or nothing, such apples floating freely even in the shallow water in the position 30, but none of the apples handled is so small that it will not be brought approximately into engagement with the bottom of the holder when floating in 1½ inches of water.

The fruit-holders are moved intermittently through spaces corresponding to the distance between successive fruit-holders, and at each dwell in the movement of the holders an apple is fed automatically to the holder at that moment standing upright above the sprockets 11. The apparatus for this purpose comprises endless chains 32 supported upon sprockets 33 and 34 at the right-hand end of the machine. The sprockets 33 are fixed on a shaft 35 which is connected, by a sprocket and a chain 36, with a sprocket 37 fixed on the shaft 38 upon which the sprockets 11 are mounted. By these means the chains 32 are moved in unison with the chains 9. A series of receptacles 39 are mounted on the chains 32, these receptacles comprising spaced fingers, as shown in Fig. 2. After passing around the sprockets 34 the receptacles 39 pass upwardly between fingers at the lower extremity of a chute or hopper 41. This hopper contains apples which are raised, one by one, by the receptacles 39 as they pass through the end of the hopper. This feeding-mechanism operates substantially like a mechanism disclosed in United States Letters Patent granted to me November 8, 1910, No. 975,064, relating to a sorting-machine, and is not claimed as part of the present invention. At each dwell in the operation of the machine one of the receptacles 39 is brought to the position of Fig. 1, in which the apple is discharged therefrom into a chute 42, through which it is delivered into one of the fruit-holders.

Each fruit-holder, when it arrives at the position of presentation, that is, in line with the fork 7, is moved horizontally toward the fork so as to impale the apple contained in the fruit-holder. To this end a slide 43 is mounted between rollers on pins 44 and 45 on the frame of the machine, and this slide is provided with a head 46 engaging the chains 9. Curved guides 47 are fixed on the head 46 in position to engage the outer surfaces of the chains, so that the chains are moved in both directions with the slide, the chains having sufficient slack between the sprockets 12 and 14 to permit movement of the necessary amplitude. The slide is moved toward the fork by means of a spring 48 fixed at one end to the slide and at the other end to the pin 45. When the slide is released the spring draws it to the left and causes the bottom-plate 15 of the holder to press the apple against the fork. The force of the spring is such as to cause the apple to be impaled, while at the same time the movement of the parts is arrested automatically by the resistance of the apple when the prongs of the fork have been completely buried in the apple, as shown in dotted lines in Fig. 1, and thus apples of various sizes are automatically impaled to the proper position on the fork.

After the impaling movement the slide 43 is retracted by a cam-mechanism. The right-hand portion of the slide is slotted, and it embraces and is guided by a cam-shaft 49 journaled in the frame of the machine. The slide carries a cam-roll 51 engaging the periphery of a cam 52 fixed on the cam-shaft. This cam causes the slide to be drawn quickly to the right, thus withdrawing the fruit-holder from the apple. As the apple is held in the fruit-holder only by the light pressure of the clamping-plates due to the springs 25, the apple remains upon the fork, and the fruit-holder returns empty to the position of Fig. 1. The cam-shaft is rotated constantly, being connected, by gears 53 and 54, with a pulley 55 which may be connected with any suitable source of power.

The advancing movements of the chains 9 and the fruit-holders are produced by mechanism comprising a cam 56 fixed on the shaft 49. This cam has a groove, shown in dotted lines in Fig. 1, which is engaged by a cam-roll 57 on a lever 58. The lever is pivoted on a stud 59 on the frame of the machine. At its left-hand end the lever is provided with a segmental gear 61 which meshes with a pinion 62 loosely journaled on the shaft 65 on which the sprockets 12 are fixed. A pawl 63 is pivoted on the pinion 62 and engages a ratchet 64 fixed on the shaft 65. At proper points in the operation of the machine the cam 56 rocks the lever 58 to the right, thereby rotating the pinion, and, through the operation of the pawl and the ratchet, the shaft 65 is rotated with the sprockets 12, thereby advancing the chains and all of the fruit-holders through a space equal to the distance between two successive holders. The subsequent left-hand movement of the cam-lever is idle, as the pawl moves freely over the ratchet when the gear 62 rotates to the right. The movements of the shaft 65 are also communicated to the shaft 38 and the sprockets 11 by mechanism comprising a shaft 70 journaled longitudinally on the frame of the machine, this shaft being driven by bevel-gearing 60 connecting it to the shaft 65 and being similarly geared to the shaft 38 (Fig. 2).

As a reservoir for surplus water, and to catch water which drips from the fruit-holders, a pan 66 is provided below the machine. The necessary depth of water is maintained automatically in the tank 8 by means of small water-carriers 67, of which one is carried by each fruit-holder. Each of these carriers becomes filled by immersion in the water in the pan 66, and its contents are carried up with the fruit-holder until the latter passes over the sprockets 11. At this point the water-carrier is tilted into a position to discharge its contents into the tank. The water-level in the tank is indicated by a line 75, and the level is determined by means of an overflow pipe 68, which drains surplus water back into the pan.

In the case of a decayed apple the frictional resistance of the apple to movement on the fork may be so slight that the apple, after being impaled, will be withdrawn again from the fork in the return movement of the fruit-holder. To free the fruit-holders from apples accidentally retained in this manner, a cam 71 is mounted near the right-hand end of the frame, in position to engage the rollers 26 and open each fruit-holder before it reaches the sprockets 11. A chute 72 is mounted beneath the fruit-holders at this point, this chute having an extremity 73 curving outwardly to the side of the machine to discharge the apples into a suitable receptacle. Perforations 74 at the bottom of the chute permit any water which drops into the chute to drain into the pan 66.

An important feature of the present machine resides in the fact that the surfaces of the fruit-clamping members, which form the sides of the fruit-holders, are in vertical position while the fruit-holders are moving horizontally through the liquid in the tank.

For this reason even when the apples are floating freely in the fruit-holders, as in the positions 28 and 29, the movement of the fruit-holders has no tendency to turn the apples and does not substantially interfere with the righting action of the apples, so that this action may continue not only while the apples are in the positions 28 and 29, but also while they are moving between these positions. In this way a substantial length of time is afforded for the automatic action to occur, while at the same time the operation of the machine is sufficiently rapid to keep the paring-and-coring-machine fully supplied with apples. Owing to the same relative arrangement of the fruit-clamping members and the fruit-pressing member or bottom-plate 15 of the fruit-holder, the pressure of the clamping-members against the apple, during the impaling operation, is normal to the axis of the fork, so that the clamping-members have no tendency to turn the apple out of position during the impaling operation.

While my invention, in its most complete embodiment, is applicable to machines for handling fruits of any kind which are adapted to right themselves automatically when floating, the invention also includes certain novel constructions and arrangement of parts which are useful, whether or not the feeding-machine is adapted to operate upon the flotation principle, and the invention is not, therefore, limited to the details of construction and operation of the embodiment thereof hereinbefore described and illustrated in the accompanying drawings, but may be embodied in various other forms within the nature of the invention as it is defined in the following claims.

In the following claims, where reference is made to the fork of a paring-machine, it will be understood that this is not intended as a limitation of the invention to its use in connection with a paring-machine, but that the fork is referred to as typifying any device adapted to hold the fruit in a definite position during an operation thereon.

I claim:—

1. A fruit-handling machine having, in combination, a receptacle adapted to contain liquid and a freely-floating fruit, a fruit-holder adapted to contain the floating fruit and comprising a fruit-pressing member and fruit-clamping members, means for moving the fruit-pressing member positively into a predetermined position to engage the end of the floating fruit so that the fruit seats itself against said member under the combined influence of its buoyancy and of the pressure of its end against said member, and means for closing the clamping-members against the fruit to hold it against the pressing-member after it has so seated itself.

2. A fruit-handling machine having, in combination, a receptacle adapted to contain liquid and a freely-floating fruit, a fruit-holder having a bottom and lateral fruit-clamping members, and means for actuating the fruit-holder, said means operating first to open the clamping-members to permit the fruit to float freely in the holder, then to raise the holder so as to reduce the depth of liquid in which the fruit floats, then to close the clamping-members to clamp the fruit, and then to move the holder to a definite position of presentation.

3. A fruit-handling machine having, in combination, a receptacle adapted to contain liquid and a freely-floating fruit, a fruit-holder having a bottom and lateral fruit-clamping members, and means for actuating the fruit-holder, said means operating first to open the clamping-members to permit the fruit to float freely in the holder, then to close the clamping-members and raise the fruit-holder so as to reduce the depth of liquid in which the fruit floats, then to open the clamping-members to permit the fruit to seat itself upon the bottom of the fruit-holder, then to close the clamping-members and move the fruit-holder to a definite position of presentation.

4. In a machine for supplying fruit to the fork of a paring-machine or the like, the combination, with a receptacle adapted to contain liquid, of a fruit-holder provided with a flat bottom and with fruit-clamping walls perpendicular to the bottom, means for feeding a fruit to the fruit-holder, and means for actuating the fruit-holder, said means operating first, to carry the fruit-holder into said receptacle to permit the fruit therein to float, then to move the clamping-walls into engagement with the fruit, then to move the fruit-holder out of the receptacle and into a position of presentation with relation to the fork, with the bottom of the fruit-holder normal to the axis of the fork, and then to move the fruit-holder toward the fork to impale the fruit thereon.

5. In a machine for supplying fruit to the fork of a paring-machine or the like, the combination, with a receptacle adapted to contain liquid, of a fruit-holder provided with a flat bottom and with fruit-clamping walls perpendicular to the bottom, means for feeding a fruit to the fruit-holder, and means for actuating the fruit-holder, said means operating first to move the fruit-holder into said receptacle to permit the fruit therein to float, then to move the fruit-holder horizontally in the liquid while the fruit still floats freely, then to move the clamping-walls into engagement with the fruit and move the fruit-holder out of the receptacle and into a position of presentation with relation to the fork, with the bottom of the fruit-holder normal to the axis of the fork, and then to move the fruit-holder toward the fork to impale the fruit thereon.

6. A fruit-handling machine having, in combination, a receptacle adapted to contain liquid, an endless conveyer, a series of fruit-holders mounted on the conveyer and each comprising clamping-walls, means for guiding the conveyer to carry the fruit-holders into and out of the liquid in the receptacle, and means for moving the clamping-walls toward each other while the fruit-holders are in the liquid.

7. A fruit-handling machine having, in combination, a receptacle adapted to contain liquid, an endless conveyer, a series of fruit-holders mounted on the conveyer and each comprising clamping-walls provided with interlacing fingers, the conveyer being guided to carry the fruit-holders into and out of the liquid in the receptacle, and means for moving the clamping-walls toward each other to clamp the fruit while the fruit-holders are in the liquid.

8. A fruit-handling machine having, in combination, a receptacle adapted to contain liquid, a plurality of fruit-holders immersed in the liquid therein, and means for moving the fruit-holders successively in a substantially horizontal direction through the liquid to advance the fruit-holders and their contents from a receiving position toward a position of delivery, each fruit-holder having substantially imperforate side-walls so as to carry with it, in such movement, a relatively-quiescent body of liquid in which a fruit may float freely.

9. A fruit-handling machine having, in combination, an endless conveyer, a series of fruit-holders, on the conveyer, having laterally-movable fruit-engaging members, means for moving the conveyer intermittently, whereby the fruit-holders are brought, successively, from a position of reception to a position of presentation, and yielding means for actuating the fruit-engaging members to cause them to clasp a fruit, after its reception, and to hold it yieldingly, in definite position, when the fruit-holder is at the position of presentation.

10. A fruit-handling machine having, in combination, a series of fruit-holders, means for intermittently moving the fruit-holders, in succession, from a position of reception to a position of presentation, and means for moving each fruit-holder, when in the position of presentation, in a direction transverse to said intermittent movement, whereby the fruit may be transferred directly to the fork of a paring-machine.

11. A fruit-handling machine having, in combination, a flexible endless conveyer provided with a series of supports for fruits, means for actuating the conveyer, in the direction of its length, so as to bring said supports successively to a position of presentation, and means for moving a portion of the conveyer transversely, at said position, whereby the supports, and the fruits thereon, may be moved successively in a direction to transfer the fruits to the fork of a paring-machine.

12. A fruit-handling machine, having, in combination, a flexible endless conveyer, a series of fruit-holders carried thereby, and means for actuating the conveyer in the direction of its length, for supporting it with a portion extending in a substantially vertical direction, and for intermittently moving the vertical portion of the conveyer transversely, whereby a fruit-holder thereon may be moved in a direction to transfer the fruit held by it to the fork of a paring-machine.

JOHN W. PEASE.

Witnesses:
D. GURNEE,
L. THON.